(No Model.)

J. B. RENSHAW.
MICROMETER DEPTH GAGE.

No. 356,892. Patented Feb. 1, 1887.

Witnesses
Frank H. Pierpont
J. J. Charter

Inventor
Joseph B. Renshaw
By his Attorney
Albert H. Walker

UNITED STATES PATENT OFFICE.

JOSEPH B. RENSHAW, OF HARTFORD, CONNECTICUT.

MICROMETER DEPTH-GAGE.

SPECIFICATION forming part of Letters Patent No. 356,892, dated February 1, 1887.

Application filed May 10, 1886. Serial No. 201,651. (No model.)

*To all whom it may concern:*

Be it known that I, JOSEPH B. RENSHAW, of Hartford, Connecticut, have invented a new and useful Depth-Gage, of which the following description and claims constitute the specification, and which is illustrated by the accompanying sheet of drawings.

This gage is to be used by machinists when making grooves or other recesses; and it may be set to the depth of one recess and then be employed to determine when other recesses have reached the same depth; or it may be set to vary one one-thousandth of an inch or any other number of thousandths of an inch from a particular depth, and then be employed to determine when other recesses have reached such variant depth.

Figure 1:
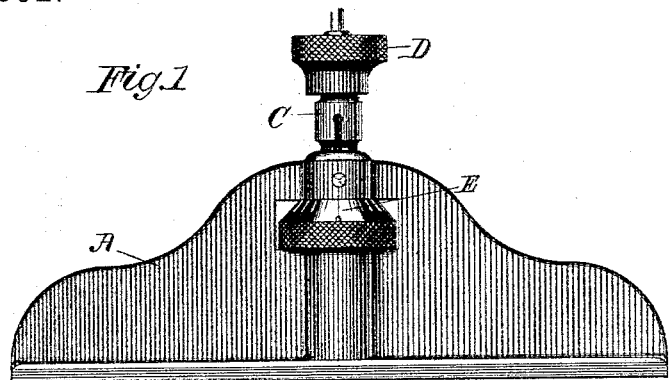
Figure 2:
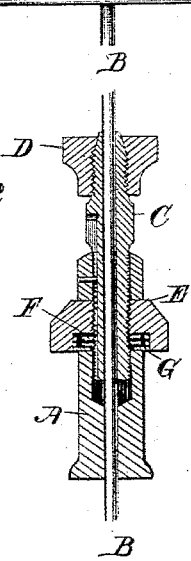
Figure 3:
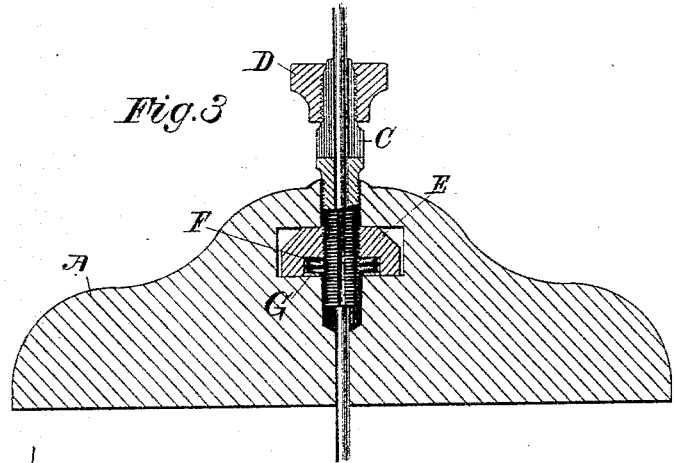

Figure 1 is a side view of the gage. Fig. 2 is a central vertical lateral section, and Fig. 3 is a central vertical longitudinal section, of the same.

A is the base-plate, from the lower straight-edge of which the depths are measured.

B is the measuring-spindle, passing vertically through the center of the base-plate and through the axes of all the other parts of the gage.

C is a sleeve splined in a vertical recess in the base-plate, so as to reciprocate but not revolve therein, and having its upper end projecting above the base-plate and diametrically split and circumferentially threaded for the reception of the clamp-nut D.

E is a milled beveled-faced graduated nut, which I term a "rosette." It works on a thread on the lower end of the sleeve C and within a recess cut through the base-plate A.

F is a coiled spring, which surrounds the sleeve C, within a recess in the lower side of the rosette.

G is a washer interposed between the spring and the lower side of the recess in the base-plate A. The thread on which the rosette works has precisely forty threads to the inch, and the diagonal surface of the rosette is provided with a scale dividing its circumference into twenty-five equal parts. The function of the spring is to keep the upper end of the rosette at all times in close contact with the upper side of the recess in which it works, and thus to prevent all accidental longitudinal motion of the rosette and consequent longitudinal movement of the spindle.

The mode of operation is as follows: The straight-edge of the base-plate is placed upon the surface of the article in which the guiding-recess is sunk, and the lower end of the spindle is thrust into that recess till its point touches the bottom. Then the clamp-nut D is screwed down, so as to bind the spindle within the sleeve. The gage may then be used for determining when other recesses have reached the same depth as the guide-recess; but if the gage is to be used to determine when other recesses have reached a depth varying from that of the guide-recess the rosette is turned on its axis one twenty-fifth of its circumference, or more, according as the desired variation is one one-thousandth of an inch or more.

I claim as my invention—

1. The combination, in a depth-gage, of the base-plate A, perforated at a right angle to its straight-edge, the spindle B, passing through that perforation and adapted to reciprocate therein, the sleeve C, splined in the base-plate at a right angle to the straight-edge thereof, the clamp-nut D, adapted to bind the spindle within the sleeve, and the rosette E, adapted by its revolutions around the axis of the spindle to cause the spindle and the sleeve to reciprocate in their respective cavities in the base-plate.

2. The combination of the base-plate A, having a recess parallel to the plane of the straight-edge thereof, the rosette E, adapted to revolve in that recess around an axis at a right angle to the straight-edge of the base-plate, the spindle B, passing through the axis of the rosette at a right angle to its diameter, and the spring F, encircling the spindle between one end of the rosette and the adjacent wall of the recess in which it revolves.

JOSEPH B. RENSHAW.

Witnesses:
ALBERT H. WALKER,
GEORGE L. RISLEY.